Dec. 18, 1934.  J. G. McNALLY ET AL  1,984,416
NONCURLING CELLULOSE ORGANIC DERIVATIVE FILM AND PROCESS OF MAKING SAME
Filed Feb. 13, 1934

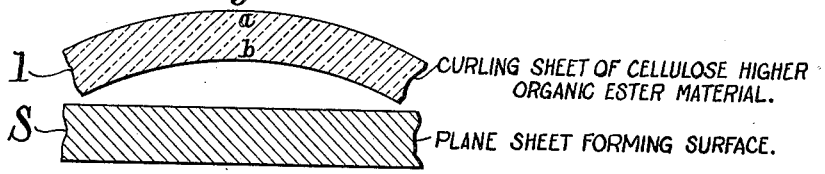

Fig. 1.
1 — CURLING SHEET OF CELLULOSE HIGHER ORGANIC ESTER MATERIAL.
S — PLANE SHEET FORMING SURFACE.

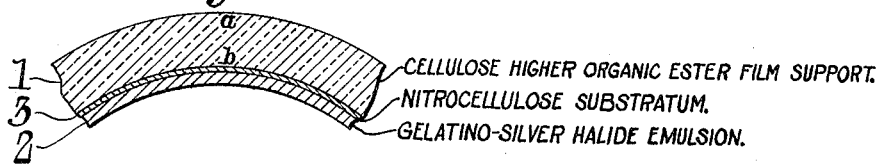

Fig. 2.
1 — CELLULOSE HIGHER ORGANIC ESTER FILM SUPPORT.
3 — NITROCELLULOSE SUBSTRATUM.
2 — GELATINO-SILVER HALIDE EMULSION.

Fig. 3.
2 — GELATINO-SILVER HALIDE EMULSION.
3 — NITROCELLULOSE SUBSTRATUM.
1 — CELLULOSE HIGHER ORGANIC ESTER FILM SUPPORT.

Fig. 4.
4 — SUPERFICIALLY HYDROLYZED LAYER.
1 — CELLULOSE HIGHER ORGANIC ESTER SHEET.

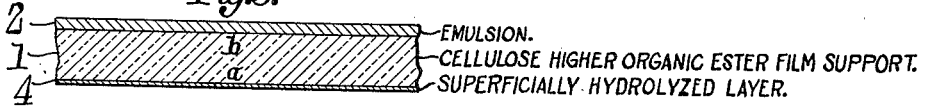

Fig. 5.
2 — EMULSION.
1 — CELLULOSE HIGHER ORGANIC ESTER FILM SUPPORT.
4 — SUPERFICIALLY HYDROLYZED LAYER.

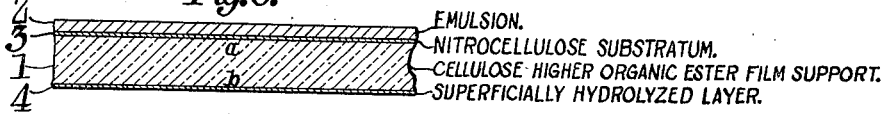

Fig. 6.
2 — EMULSION.
3 — NITROCELLULOSE SUBSTRATUM.
1 — CELLULOSE HIGHER ORGANIC ESTER FILM SUPPORT.
4 — SUPERFICIALLY HYDROLYZED LAYER.

Inventors:
James G. McNally & Norman F. Beach,
Newton W. Perrine
By Henry S. Boynton.
Attorneys.

Patented Dec. 18, 1934

1,984,416

UNITED STATES PATENT OFFICE 1,984,416

NONCURLING CELLULOSE ORGANIC DERIVATIVE FILM AND PROCESS OF MAKING SAME

James G. McNally and Norman F. Beach, Rochester, N. Y., assignors to Eastman Kodak Company, Rochester, N. Y., a corporation of New York Application February 13, 1934, Serial No. 711,037

16 Claims. (Cl. 17—57)

This invention relates to cellulose derivative sheeting produced from the higher organic esters or mixed organic esters of cellulose, and more particularly to a method designed to produce sheeting of this type which will lie flat and not curl. The invention has particular reference to the prevention of curling in photographic film supports and film structures in general in which one or more layers or substrata are superimposed upon a cellulose derivative support.

As is well known cellulose derivative sheeting, particularly photographic film support, has a pronounced tendency to curl and roll up on removal from the surface upon which it is formed. This is presumably due to the fact that when a cellulose derivative solution is cast in the form of a sheet or film upon a given surface and then cured the solvent evaporates more rapidly from the upper layers of the material than from those layers which lie close to the film-forming surface. This apparently produces a difference in structure between the upper and lower layers of the film setting up an unequal internal strain or pull on one side. Not only does sheeting formed in this way have an inherent tendency to curl, but this curling tendency is accentuated when the sheeting is treated by applying thereto layers or coatings of other material, particularly if such layers are applied to that surface already having a tendency to curl.

This defect received considerable attention in the early development of photographic film and numerous expedients were resorted to for its correction. One of the earliest methods for the prevention of curling was the application to the side of the sheet opposite the curling side, of a layer of material which tended to cause the sheet to curl in an opposite direction thereby offsetting or neutralizing the curling tendency of the uncoated surface. It was found, for example, that if a photographic film comprising a cellulose derivative support was coated on one surface with a gelatin emulsion the film curled very badly, but if the uncoated opposite surface was also coated with gelatin, the curling tendency was neutralized and the film would lie flat. Another method commonly employed was to moisten the surface of the film opposite the curling surface with a solvent and then dry the film. This tends to produce a pull on the treated surface which counteracts the tendency of the film to curl. Numerous other expedients along this line have been attempted, but most of them consist in the application of coatings of some kind. Inasmuch as there are many conditions which make the first mentioned method undesirable the second is generally used in actual practice. This has been found satisfactory for cellulose nitrate and cellulose acetate films, but has been found to be wholly unsatisfactory when applied to films produced from certain of the higher cellulose esters, or mixed esters, particularly cellulose acetate propionate.

It is the principal object of the present invention to provide a new method for the prevention of curling in sheeting produced from the higher organic esters and mixed esters of cellulose, the curling tendencies of which cannot be successfully corrected by known methods. A further object is to provide a method of preventing curling of this type of sheeting when coated on one or both sides with other materials, such as gelatin or cellulose derivatives. A still further object is to provide a non-curling type of cellulose higher organic ester sheeting which is especially adapted for use as a photographic film support. A specific object is to provide a photographic film having a non-curling support formed of cellulose acetate propionate. Other objects will appear hereinafter.

We have found that the curling tendencies of cellulose higher organic ester sheeting or film may be neutralized by subjecting it to a superficial hydrolyzing action which chemically alters the surface structure of the material and produces thereon a superficial layer of hydrolyzed or deesterified cellulose. Our invention has particular reference to the treatment of the higher organic esters of cellulose, especially the mixed organic esters, such as cellulose acetate-propionate, inasmuch as the curling tendencies of these products are, as previously pointed out, not susceptible of correction by other methods. In its broadest aspects, our invention comprises treating the surface of the sheet or film opposite the curling surface with a relatively dilute solution of sodium, potassium, or ammonium hydroxide, or other suitable hydrolyzing agents.

We shall now describe several of the preferred embodiments of our invention, but it is to be understood that the examples given and the accompanying description are included merely for purposes of illustration and not as a limitation thereof.

As will be apparent from the following description, our process is particularly adapted for the treatment of photographic film support and the manufacture of photographic film. A number of different photographic structures will be described for the purpose of illustrating the broad scope of the invention.

In the accompanying drawing in which like numerals refer to like parts:

Figure 1 is a fragmentary section through a sheet of cellulose higher organic ester material after curing, illustrating its inherent curling tendencies.

Figures 2 and 3 illustrate how various coatings or substrata induce or increase the curling tendency of cellulose organic derivative sheet material.

Figure 4 is an enlarged fragmentary section through a type of sheeting produced in accordance with our invention and in which the curling tendency has been completely neutralized.

Figures 5 and 6 are fragmentary sections through a non-curling type of photographic film produced in accordance with our invention.

In all of the figures of the drawing above referred to, it will of course be understood that the thicknesses of the various layers, as well as of the sheet or film itself, have been greatly exaggerated in the interest of clearness of illustration.

Assuming that it is desired to correct the curling tendency of a cellulose acetate-propionate sheet in accordance with the invention, the sheet is treated with a suitable hydrolyzing agent. The treatment may be carried out by any of the methods and apparatus customarily employed in the art for applying liquids or coatings to film surfaces. For example, where both surfaces are to be superficially hydrolyzed, the sheet or film may be immersed in an alkaline solution of the desired strength. Where only one surface of the sheet is to be treated, the alkaline liquid may be applied to it by floating the sheet on the surface of the treating liquid with only one face in contact therewith, or by applying the liquid to the surface of the sheet by means of an applicator roll over which the film is moved. Another method is to brush or spray the hydrolyzing solution on the sheet or film. In some cases, especially when using the more concentrated alkaline solutions, it is desirable to wash the treated surface of the material after the hydrolyzing operation in order to remove excess alkali. This may be done in any convenient way, such as by immersion in a suitable water bath or by passing the sheet through an apparatus in which a continuous stream or spray of water is caused to play upon the hydrolyzed surface.

Any of the usual hydrolyzing agents may be employed, typical examples of which are sodium, potassium and ammonium hydroxides, sodium methylate, sodium ethylate, ethyl amine, tetra-ethyl ammonium hydroxide, and the like. When treating a cellulose organic ester sheet, especially one formed of one of the mixed cellulose organic esters, such as cellulose acetate-propionate. We find that any one of the following compositions may be employed with good results:

| | Parts |
|---|---|
| 1. NaOH | 5 |
| Water | 100 |
| 2. NaOH | 5 |
| Water | 50 |
| Alcohol | 50 |
| 3. Sodium methylate | 2 |
| Methyl alcohol | 100 |
| 4. Sodium ethylate | 5 |
| Ethyl alcohol | 100 |
| 5. Sodium ethylate | 5 |
| Ethyl alcohol | 50 |
| Dioxan | 50 |
| 6. Sodium ethylate | 8 |
| Sodium hydroxide | 4 |
| Ethyl alcohol | 50 |
| Ethylene Chloride | 50 |
| 7. Ethyl amine | 10 |
| Alcohol | 100 |
| 8. Tetra ethyl ammonium hydroxide | 10 |
| Acetone | 100 |

The degree of hydrolysis is, in general, to be determined by the type of sheet or film dealt with and no rule can be laid down which will apply to all cases. It may be said in general that the greater the inherent curling tendency of a given material, the more drastic should be the hydrolyzing action. It will be evident that if the cellulose organic derivative sheet has a layer or layers of another cellulose derivative, such as cellulose nitrate, coated thereon, or has a gelatin layer which in itself accentuates the inherent curling tendency of the film, a more drastic treatment should be given to offset the increased curling tendency due to the superimposed coatings. Likewise, the thicker the sheeting, the more drastic should be the hydrolyzing action.

The action of the hydrolyzing bath may be controlled by regulating the length of time the liquid is permitted to remain in contact with the sheet or film, by regulating the concentration of the hydrolyzing agent in the solution, and certain other factors well known to those skilled in the art.

Our invention will be more clearly understood by reference to the various figures of the drawing. In Figure 1 there is represented a type of cellulose higher organic ester sheeting 1 which has been removed from the sheet forming surface S. It will be seen that the evaporation of solvents from the upper portion $a$ of the sheet during curing has occasioned a pull or strain on the sheet in such manner as to cause it to curl or become concave on side $b$ toward the film-forming surface.

In Figure 2 is shown a portion of the same type of cellulose derivative sheeting 1 as shown in Fig. 1, in this case forming the support of a light-sensitive photographic film and provided with a coating of light-sensitive gelatino-halide emulsion 2 on surface $b$ as well as a thin coating or substratum 3 of nitrocellulose interposed between the emulsion and the support. In this case, the natural curling tendency of the underside $b$ of the support is accentuated by the presence of the nitrocellulose substratum and the gelatine emulsion.

In Figure 3 there is illustrated a sheet or film having the nitrocellulose sub and the gelatine emulsion applied to surface $a$ and causing the film to curve toward the subbed or coated side.

Referring to Figure 4, the sheet 1 of Figure 1 has been treated by the application of a hydrolyzing solution to its upper surface *a*, that is, the surface opposite the forming surface. This results in the production of a very thin hydrolyzed layer 4 which presumably differs structurally from the material of the lower surface *b* and thus creates a strain or pull in an opposite direction to that taking place in the surface *b* and causing the sheet to lie flat.

In Figure 5 the support 1 is coated with a gelatino-silver halide emulsion 2 which would normally cause the structure to curl or become concave with respect to the emulsion-coated side, but which remains flat and non-curling due to the presence in the opposite surface of an extremely thin layer 4 of the hydrolyzed cellulose organic ester material produced by treating the film with a hydrolyzing solution as above outlined.

The product illustrated by Figure 6 is substantially the same as that illustrated in Figure 5 with the exeception that a substratum of nitrocellulose 3 lies between the support 1 and the emulsion layer 2, the substratum, as previously pointed out, tending to increase the inherent curling effect of the emulsion layer 2. This product is however, as flat and non-curling as the product illustrated in Figure 5 due to the presence of the superficial layer of hydrolyzed cellulose organic ester produced by the same type of hydrolyzing action. In this case, however, the hydrolyzing action has been carried to a slightly greater extent in order to counteract the greater tendency of this doubled-coated type of film to curl.

Although we have chosen to illustrate our invention by reference to cellulose acetate propionate sheets or film support, it is to be understood that we do not limit ourselves to the treatment of this particular material since it is equally applicable to the treatment of sheets or films produced from the higher organic esters of cellulose, such as cellulose propionate, cellulose butyrate, cellulose stearate and the like, or mixed organic esters of cellulose, such as cellulose acetate-butyrate, cellulose acetate-stearate, and so on. Neither do we limit ourselves to the particular hydrolyzing agents described above, or to the details of procedure for bringing about hydrolysis of the film.

It will be evident from the above description that our invention possesses a number of outstanding advantages, the principal of which is the elimination of the necessity for the use of separate non-curling coatings or subs in order to prevent curling in cellulose organic derivative sheeting and photographic film. This represents a great saving of time, labor, and material and constitutes a marked advance over the prior art methods. The hydrolyzing operation can be very conveniently carried out in connection with the manufacture of sheet or of photographic film itself and represents an extremely simple and convenient method of attaining the desired result. Our process is particularly to be distinguished by the fact that the surface of the sheet or film is itself chemically and structurally altered as distinguished from merely coating.

Our invention is particularly valuable for reducing the curling tendency of sheets formed of the higher organic esters, particularly cellulose acetate-propionate, since this material cannot satisfactorily be treated in any other way for the reduction of its inherent curling tendencies.

What we claim is:

1. A non-curling sheet formed of a higher organic ester of cellulose, at least one surface of which is superficially hydrolyzed.

2. A non-curling sheet comprising a base sheet formed of a higher organic ester of cellulose having on one surface a coating of another cellulose ester and having the opposite surface superficially hydrolyzed.

3. A non-curling sheet formed of a mixed organic ester of cellulose, at least one surface of which is superficially hydrolyzed.

4. A non-curling sheet comprising a base sheet formed of a mixed organic ester of cellulose having on one surface a coating of another cellulose ester and having the opposite surface superficially hydrolyzed.

5. A non-curling sheet formed of cellulose acetate-propionate, at least one surface of which is superficially hydrolyzed.

6. A non-curling sheet comprising a base sheet of cellulose acetate-propionate coated on one surface with another cellulose ester and having the opposite surface superficially hydrolyzed.

7. A non-curling sheet comprising a base sheet of cellulose acetate-propionate coated on one surface with nitrocellulose and having the opposite surface superficially hydrolyzed.

8. A non-curling photographic film comprising a support formed of a higher organic ester of cellulose having coated on one surface thereof a light-sensitive gelatino-silver halide emulsion and having the opposite surface superficially hydrolyzed.

9. A non-curling photographic film comprising a support formed of a higher organic ester of cellulose having on one side thereof a thin coating of another cellulose ester, and a light-sensitive gelatino-silver halide emulsion superimposed on said cellulose ester layer, the opposite surface of the support being superficially hydrolyzed.

10. A non-curling photographic film comprising a support formed of a mixed organic ester of cellulose having coated on one surface thereof a light-sensitive gelatino-silver halide emulsion and having the opposite surface superficially hydrolyzed.

11. A non-curling photographic film comprising a support formed of cellulose acetate-propionate having coated on one surface thereof a light-sensitive gelatino-silver halide emulsion and having the opposite surface superficially hydrolyzed.

12. A non-curling photographic film comprising a support formed of cellulose acetate-propionate, having on one surface thereof a thin coating of cellulose nitrate, a light-sensitive gelatino-silver halide emulsion superimposed on said nitrocellulose coating, the opposite surface of said support being superficially hydrolyzed.

13. The method of preventing curling in a sheet formed of a higher organic ester of cellulose and having an inherent tendency to curl which comprises superficially hydrolyzing the surface opposite that which tends to curl.

14. The method of preventing curling in a sheet formed of a cellulose mixed organic ester and having an inherent tendency to curl which comprises superficially hydrolyzing the surface opposite that which tends to curl.

15. The method of preventing curling in a sheet formed of a mixed organic ester of cellulose and having a coating on one surface thereof, which tends to cause the sheet to curl on that side which comprises superficially hydrolyzing the uncoated surface.

16. The method of preventing curling in a photographic film comprising a support formed of a mixed cellulose organic ester and having a light-sensitive gelatino-silver halide emulsion on one surface thereof, which tends to cause the sheet to curl on that side which comprises hydrolyzing the surface opposite the emulsion.

JAMES G. McNALLY.
NORMAN F. BEACH.